R. M. HUNTER.
IMPLEMENT DRAFT APPLIANCE.
APPLICATION FILED NOV. 10, 1919.

1,394,903.

Patented Oct. 25, 1921.

Inventor
Robert M. Hunter
By
*(signature)* Attorney

UNITED STATES PATENT OFFICE.

ROBERT M. HUNTER, OF LEXINGTON, KENTUCKY, ASSIGNOR TO THE DUNHAM COMPANY, OF BEREA, OHIO, A CORPORATION OF OHIO.

IMPLEMENT DRAFT APPLIANCE.

1,394,903. Specification of Letters Patent. Patented Oct. 25, 1921.

Application filed November 10, 1919. Serial No. 336,783.

*To all whom it may concern:*

Be it known that I, ROBERT M. HUNTER, a citizen of the United States, residing at Lexington, in the county of Fayette and State of Kentucky, have invented certain new and useful Improvements in Implement Draft Appliances, of which the following is a specification.

My invention relates to improvements in implement draft appliances, and more particularly to that class or type of agricultural implement which are adapted to be drawn by one or more draft animals, the present embodiment of the invention being particularly designed and adapted for use in connection with earth working implements used in cultivating rows of growing crops, shrubbery, trees, and the like.

A very important object of my invention is the provision of an improved draft appliance so attached and arranged and disposed relative to the implement frame as to enable such draft appliance to be readily transposed to form a centrally located two-pole tongue for use in connection with two draft animals or whereby the draft pole member on one side or the other may be readily shifted to the adjacent side of the implement frame forming properly spaced off-set shafts for a single draft animal and whereby the opposite side of the implement is adapted to be drawn in relatively close proximity to a row of growing plants, small trees, or the like, improved brace and seat supporting members being adapted to readily secure such shaft members in their respective shifted position.

The primary object of the invention is to provide a generally improved variable draft appliance of the class or type indicated which will be exceedingly simple in construction, cheap of manufacture, and efficient in use.

With the above mentioned and other ends in view, the invention consists in the novel construction, arrangement and combination of parts, hereinafter described, illustrated in one of its embodiments in the accompanying drawings, and particularly pointed out in the appended claims.

Figure 1:
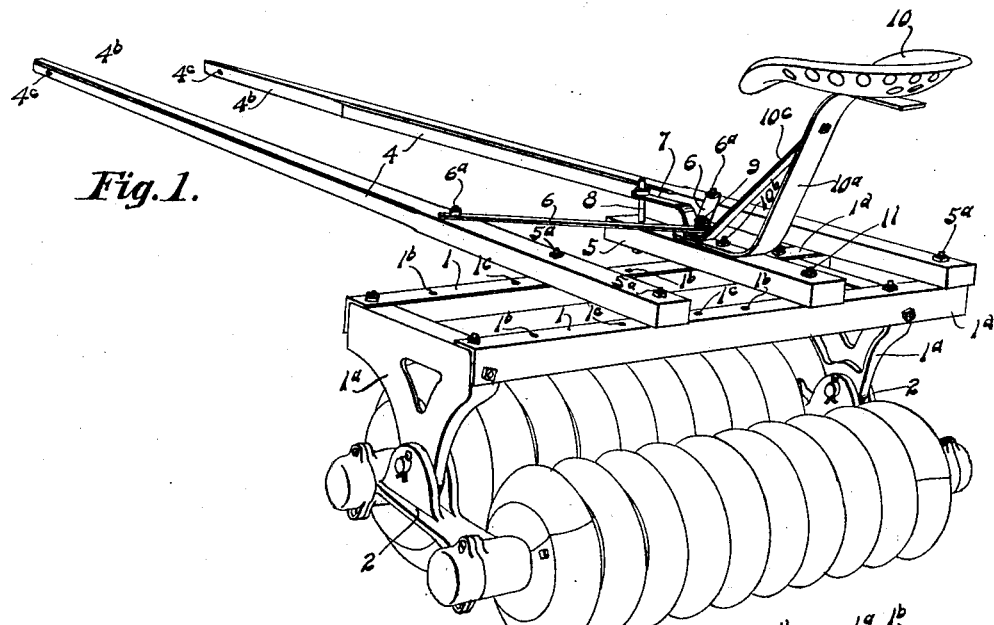

Referring to the drawings, forming a part of this specification, Figure 1, is a perspective view of an agricultural implement of the roller or soil pulverizing type equipped with the variable draft appliance constructed in accordance with this invention, the draft pole members being shifted to one side forming a pair of off-set shafts for a single draft animal and whereby the opposite side of the implement is adapted to be drawn or projected in close proximity to a row of growing plants, trees, or the like.

Figure 2:
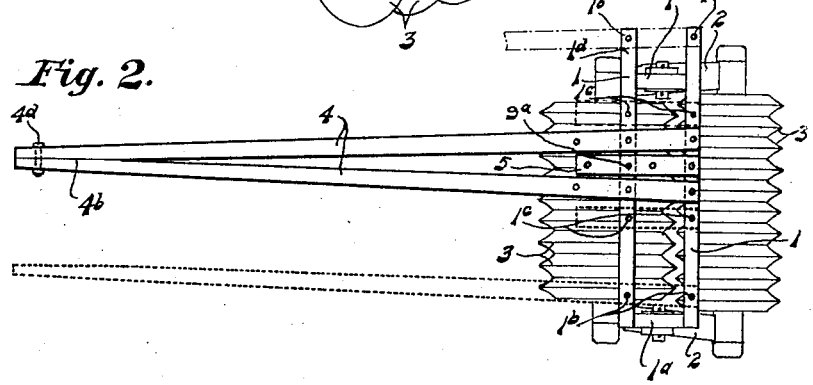

Fig. 2, a top plan view of the same, the draft pole members being shifted into central abutting relation, forming a double or two-pole tongue for two draft animals, the dotted lines indicating the relative predetermined positions of the draft pole members and the brace and seat supporting members when shifted to one side or the other to form off-set shafts at either side of the implement frame.

Similar numerals of reference designate like parts throughout all the figures of the drawings.

The implement frame and the soil cultivating or earth working elements may be of any suitable and convenient form or construction, but for the purpose of illustration I have shown my improved draft appliance attached or embodied in an agricultural implement of the roller or soil pulverizing type.

The implement frame, in the present instance, comprises transverse frame members 1, connected to bearing or bracket members 1ª, the latter, in the present instance, being connected to floating or oscillatory frame or bracket members 2, the latter being connected to axle or bearing shafts carrying, in the present instance, earth working elements 3, in the specific form of packer or pulverizer disks of a well known type.

Referring now to the improved implement draft appliance, to which this invention particularly relates, it will be seen that I provide a pair of forwardly converging pole members 4, together with a seat supporting and brace connecting member 5, said pole and seat supporting members 4 and 5, respectively, being adapted to be secured to the implement frame members 1, in certain predetermined relative positions for the purposes hereinafter referred to and explained.

The seat supporting member 5, is provided at its front with a pair of brace straps 6, and a clevis strap 7, the latter being provided with a removable bearing bolt 8. The rear ends of the straps 6 and 7, may be secured by a single fastening bolt or element 9, and passing through a suitable opening 9ª, in the brace and seat supporting member 5.

A seat 10, is carried by the seat supporting member 5, through the medium of a seat supporting member or standard 10ª, the latter being secured by a bolt or fastening element 10ᵇ, and the support 10ª, being also further supported by means of a brace member 10ᶜ, the brace 10ᶜ, being secured by the fastening element 9, which secures the parts 6 and 7.

Referring now to the improved means for securing the pole members 4, in either central tongue forming or in side or off-set shaft forming positions, it will be seen that the frame members 1, are provided with a series of properly spaced and arranged bolt or fastening element receiving openings, 1ᵇ, adapted to receive and contain suitable bolt or fastening elements, for the pole members and suitable openings 1ᶜ, for receiving suitable bolts or fastening elements 5ª, for the seat supporting and brace connection member 5.

When it is desired to provide a pair of off-set shafts, as shown in Fig. 1, of the drawings, one of the pole members 4, is moved away from the central pole member and fastened in the openings 1ᵇ, near the end of the implement frame and the brace members or straps 6, are connected to the pole members by means of fastening bolts or elements 6ª. It will be seen also that the seat supporting and brace connecting member 5, is mounted midway between the shafts by being mounted in the corresponding openings through the bolts or fastening elements 9 and 11. A corresponding shifting of the left hand pole member to the dotted lines shown at the lower portion of Fig. 2, when the pole members 4, are in their central or tongue forming position, will off-set the shafts to the left hand side of the implement. In an implement of the class illustrated, the ends of the frame members 1, at one side are preferably extended forming extension members 1ᵈ, projecting beyond one of the bracket members 1ª, so as to bring the earth working elements or disks 3, a more substantial distance from the shafts and enabling slightly closer cultivation than when the shafts are off-set to the left of the implement.

In giving the pole members 4, the proper relative position in their forwardly converging relation to each other and in either their tongue forming or their off-set draft forming position the front inner sides of the pole members 4, are preferably beveled, as at 4ᵇ, to abut against each other when closed, and as a means of securing the forward ends of the pole members 4, together in their double or twin pole tongue forming position, the forward ends of the pole members 4, are preferably provided with registering openings 4ᶜ, adapted to receive and contain a connecting bolt or element 4ᵈ.

From the foregoing description, taken in connection with the accompanying drawings, the operation and advantages of my invention will be readily understood.

Having thus described one of the embodiments of my invention, without having attempted to set forth all the forms in which it may be made or all the modes of its use, what I claim and desire to secure by Letters Patent, is,—

1. In an agricultural implement, an implement frame, a seat supporting member detachably mounted on said frame, brace members on said seat supporting member, draft pole members detachably secured in predetermined forwardly converging relation to each other in a centrally arranged abutting position forming a two-pole tongue on opposite sides of said seat supporting member, and means whereby either pole member may be shifted to its respective side and secured to the implement frame and said brace members at one side or the other forming properly spaced off-set shaft members.

2. In a variable draft appliance for implements, the combination with an implement having a pair of draft pole members and fastening element receiving openings spaced apart at predetermined positions to receive said draft pole members in variable forwardly converging positions, seat supporting and draft pole brace members on said frame, and detachable fastening elements for securing said draft pole and brace and seat supporting members in either a central abutting position forming a two-poled draft tongue or in a laterally spaced position of one pole member from the other or remaining central pole member whereby off-set shaft members are connected and braced at either side of the implement frame.

In testimony whereof I have affixed my signature.

ROBERT M. HUNTER.